US011904328B2

(12) United States Patent
Kana et al.

(10) Patent No.: US 11,904,328 B2
(45) Date of Patent: Feb. 20, 2024

(54) INDUCTION POWERED VORTEX FLUID SEPARATOR

(71) Applicant: SpineSmith Partners, L.P., Austin, TX (US)

(72) Inventors: Richard J. Kana, Lexington, TX (US); Kevin Dunworth, Austin, TX (US)

(73) Assignee: SpineSmith Partners, L.P., Austin, TX (US)

( * ) Notice: Subject to any disclaimer, the term of this patent is extended or adjusted under 35 U.S.C. 154(b) by 0 days.

(21) Appl. No.: 17/898,658

(22) Filed: Aug. 30, 2022

(65) Prior Publication Data

US 2023/0065432 A1 Mar. 2, 2023

Related U.S. Application Data

(60) Provisional application No. 63/238,766, filed on Aug. 30, 2021.

(51) Int. Cl.

| | |
|---|---|
| ***B04C 3/00*** | (2006.01) |
| ***B04C 3/02*** | (2006.01) |
| *B04C 9/00* | (2006.01) |

(52) U.S. Cl.

CPC .......... *B04C 3/02* (2013.01); *B04C 2003/003* (2013.01); *B04C 2009/004* (2013.01); *B04C 2009/007* (2013.01)

(58) Field of Classification Search

CPC ........... F01M 13/04; F01M 2013/0422; F01M 2013/0427; B01D 45/14; B04B 5/005; B04B 5/12; B04B 9/06; B04B 9/10; B04B 2005/125; B04C 3/02; B04C 2003/003; B04C 2009/004; B04C 2009/007

See application file for complete search history.

(56) References Cited

U.S. PATENT DOCUMENTS 4,343,707 A * 8/1982 Lucas ........................ B04C 1/00 210/695
4,994,097 A * 2/1991 Brouwers ................. B04C 9/00 55/408
5,284,250 A * 2/1994 Stepenhoff ................ B04C 5/00 210/512.1
6,213,929 B1 * 4/2001 May .......................... B04B 9/06 494/24
6,355,178 B1 * 3/2002 Couture .................... B04C 9/00 210/695
7,282,074 B1 * 10/2007 Witter ...................... B24B 55/06 451/87

(Continued)

*Primary Examiner* — Dung H Bui
(74) *Attorney, Agent, or Firm* — Winstead PC

(57) ABSTRACT

A method of separating a fluid includes adding a fluid to a canister of a fluid separator. The canister includes first and second barriers disposed concentrically within the canister that define a first and second annulus within the canister, and a canister rotor having a first magnet associated therewith. The method includes rotating an induction base rotor disposed within an induction base. The induction base rotor includes a second magnet. The canister rotor and the induction base rotor are magnetically coupled and rotating the induction base rotor causes the canister rotor to rotate. The method further includes forming a vortex in the fluid via the rotation of the canister rotor, and the vortex causes the fluid to separate into a first component and a second component.

8 Claims, 7 Drawing Sheets

(56) References Cited

U.S. PATENT DOCUMENTS

| | | | | |
|---|---|---|---|---|
| 2001/0012814 | A1* | 8/2001 | May | B04B 9/06<br>494/24 |
| 2002/0139249 | A1* | 10/2002 | Livingston | B01D 45/14<br>55/406 |
| 2004/0256312 | A1* | 12/2004 | Gomez | B03C 1/30<br>210/512.3 |
| 2005/0192525 | A1* | 9/2005 | Wieting | A61M 5/36<br>604/6.09 |
| 2009/0186752 | A1* | 7/2009 | Isaksson | B04B 9/04<br>494/40 |
| 2011/0281712 | A1* | 11/2011 | Schlamann | B04B 5/12<br>494/7 |
| 2013/0190159 | A1* | 7/2013 | Watahiki | B04B 15/08<br>494/11 |
| 2015/0224517 | A1* | 8/2015 | Ramalingam | B04C 9/00<br>210/85 |
| 2016/0030875 | A1* | 2/2016 | Parikh | B01D 46/0056<br>55/400 |
| 2017/0144092 | A1* | 5/2017 | Seeley | B01D 47/16 |
| 2017/0247896 | A1* | 8/2017 | Hayes | E04H 4/1636 |
| 2017/0312761 | A1* | 11/2017 | Patruno | B01D 19/0057 |
| 2017/0320069 | A1* | 11/2017 | Whitehead | B01D 45/14 |
| 2017/0368481 | A1* | 12/2017 | Shrivastava | B01D 36/045 |
| 2019/0039006 | A1* | 2/2019 | Akdim | B01F 27/053 |
| 2019/0134648 | A1* | 5/2019 | Hu | B04C 3/06 |
| 2019/0224690 | A1* | 7/2019 | Birk | B04B 9/06 |
| 2021/0060467 | A1* | 3/2021 | Cognata | B01D 19/0052 |

* cited by examiner

INDUCTION POWERED VORTEX FLUID SEPARATOR

CROSS-REFERENCE TO RELATED APPLICATIONS

This patent application claims priority to U.S. Provisional Application No. 63/238,766, filed Aug. 30, 2021. U.S. Provisional Patent Application No. 63/238,766 is incorporated herein by reference.

TECHNICAL FIELD

The present disclosure relates generally to fluid separators and more particularly, but not by way of limitation, to an induction-powered vortex fluid separator.

BACKGROUND OF THE INVENTION

This section provides background information to facilitate a better understanding of the various aspects of the disclosure. It should be understood that the statements in this section of this document are to be read in this light, and not as admissions of prior art.

Separation processes are one of the most widely used industrial processes, especially in chemical and petrochemical industries. Such separation processes are also one of the most expensive industrial processes. They require costly capital investments such as distillation columns and high utility expenditures for both heating and cooling. Currently, the fractional distillation process is almost exclusively used for separation of species with high process rates.

Typical separation devices used in the medical industry require the use of a centrifuge. Centrifuges can become quite heavy and are typically very expensive. Another disadvantage of the centrifuge is the noise generated during its use. Also, proper balancing of a centrifuge is essential to avoid a potential disaster.

SUMMARY

The devices of the instant application are relatively small and light compared to traditional centrifuges. The devices of the instant application and their peripheral components can be easily carried into and out of a hospital operating room or clinic treatment room. Cost is reduced compared to traditional centrifuges, and, in some aspects, a portion of the device is disposable and labeled for single use. The devices of the instant application will generate very little noise compared to traditional centrifuges, as the operation of the device is carried out by a small electric motor and the stirring of fluid, sounds that may not even be heard over the ambient noise of a treatment area. There is no rotational balancing required for the device, reducing costs and removing the possibility of failure from rotational imbalance.

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION

Figure 1:
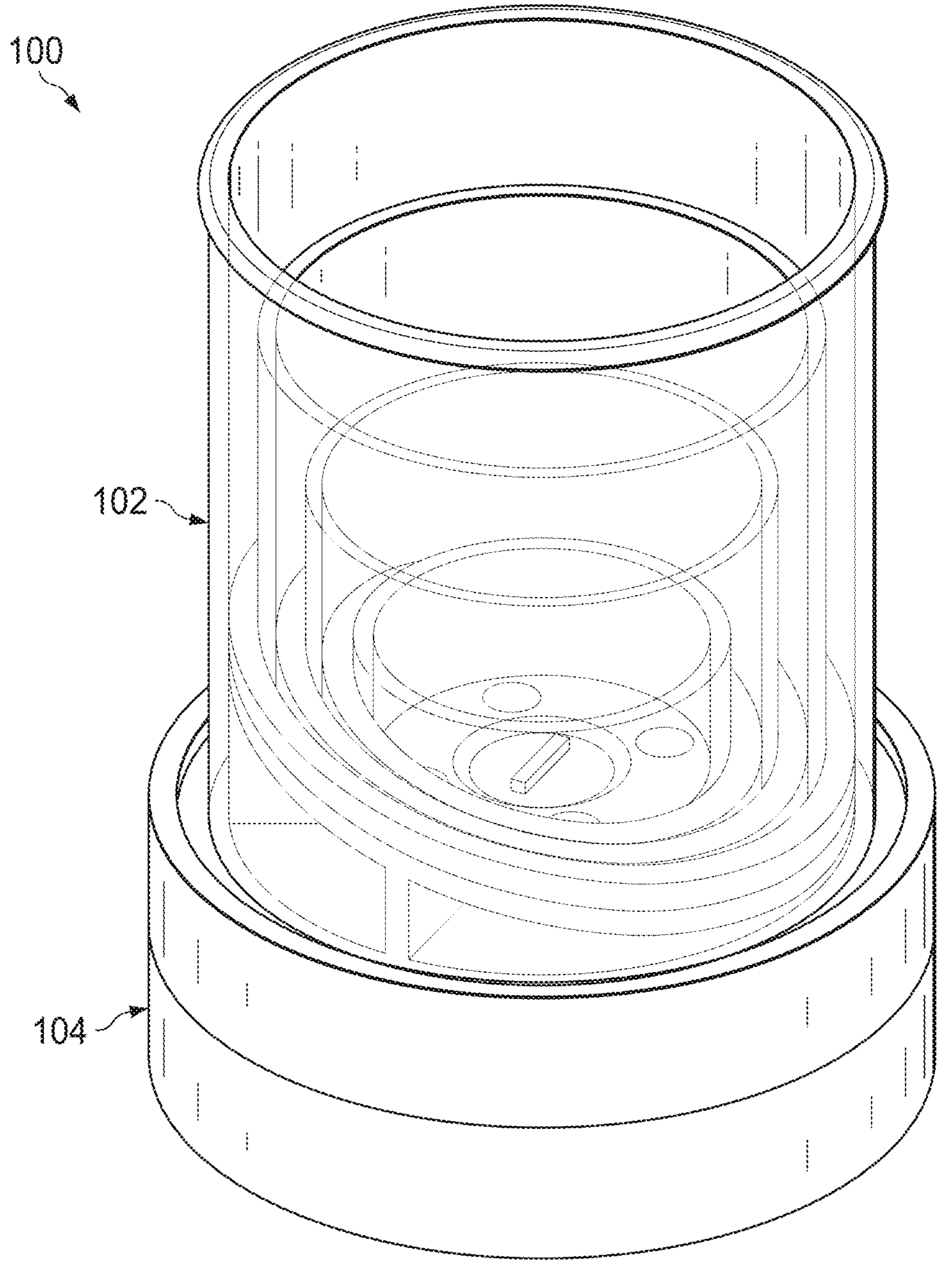
FIG. 1 is a perspective view of a processing canister assembly positioned on an induction base assembly, according to aspects of the disclosure.

It is to be understood that the following disclosure provides many different embodiments, or aspects, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
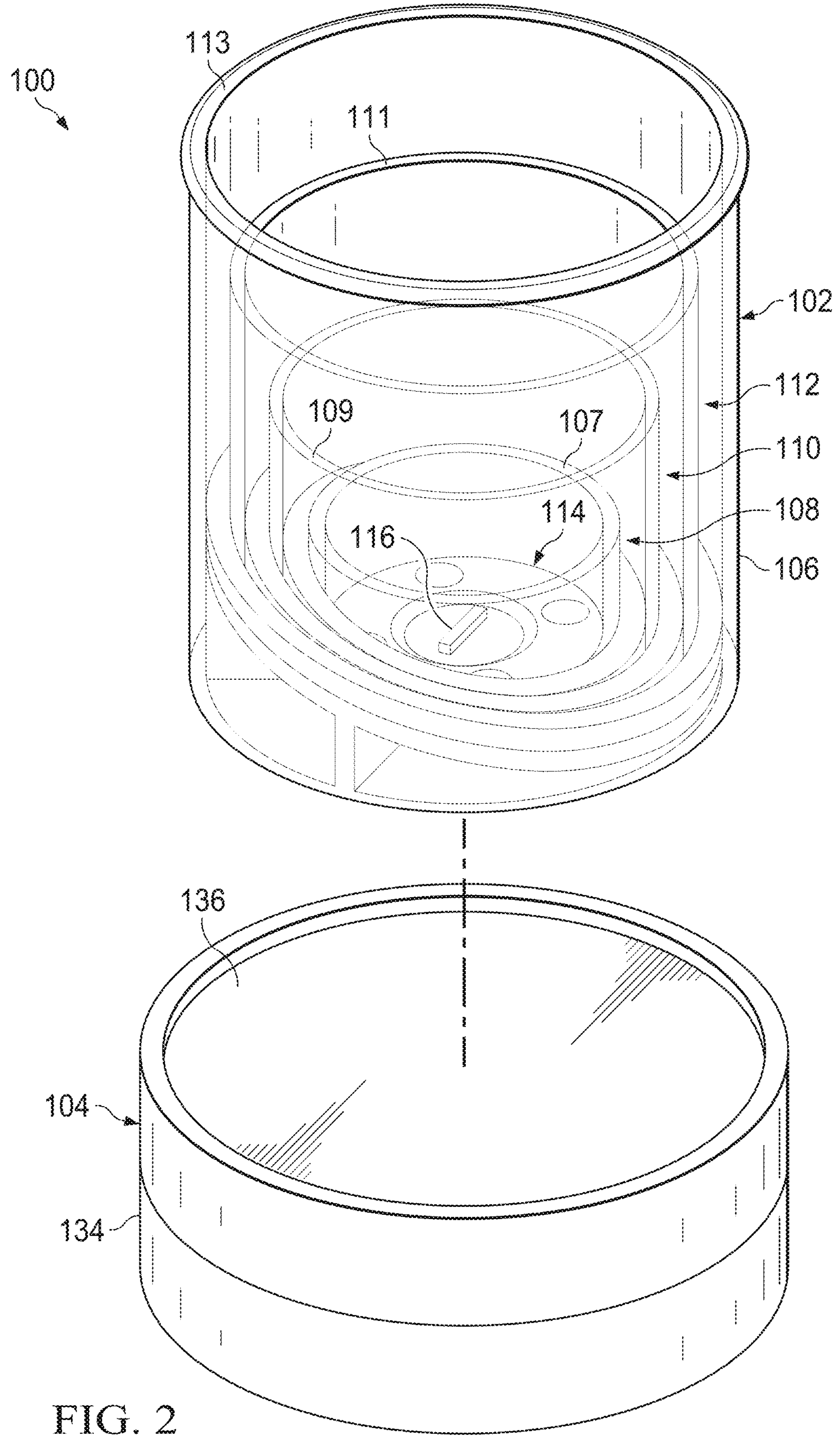
FIG. 2 is a perspective view of a processing canister assembly positioned above an induction base assembly, according to aspects of the disclosure.

FIGS. 1 and 2 illustrate a fluid separator 100 according to aspects of the disclosure. Fluid separator 100 includes two assemblies: a processing canister assembly 102 and an induction base assembly 104. FIG. 1 illustrates assembly 102 seated on top of assembly 104. In FIG. 2, assembly 102 is shown separated from assembly 104. Fluid separator 100 separates various components within a given fluid without the use of traditional centrifugation. Fluid separator 100 may be used, for example, in the medical industry in a patient treatment area such as a hospital operating room. Fluid separator 100 is relatively small compared to traditional centrifuges and can be configured as a single-use device for sterility and economic reasons.

In some aspects, fluid separator 100 is intended for the processing of biological fluids, such as bone marrow and blood, which are broken down and separated into their various components. Fluid separator 100 separates the fluid being processed by stirring the fluid to create a vortex within a canister 106. The rotation of the fluid separates components based upon their densities. As viewed from the top of the processing canister assembly looking down, the fluid vortex rotates about a vertical centerline axis while at the same time, viewing from the side, rotates the fluid in both clockwise and counterclockwise directions, which will move fluid from the top of the fluid canister to the bottom of the fluid canister.

The force generated by the vortex, and based on the weight and size of the components of fluid, separates the components of the fluid. The separated components settle into various chambers or capture areas of canister 106 of processing canister assembly 102 (annuluses 108, 110, 112 between concentric walls 107, 109, 111, 113 respectively, of canister 106. Three annuluses are shown in the Figures, but it will be appreciated that canister 106 can be configured with more or fewer annuluses depending on the desired fluid separation. Canister 106 includes four barriers/walls 107, 109, 111, 113 that are concentrically nested together, with each successive barrier terminating at a taller axial height moving from the inside of canister 106 to the outside of canister 106. Canister 106 is shown in the Figures as transparent for illustrative purposes. In various aspects, canister 106 may be made of various materials such as metals, ceramics, plastics, glass and the like. A vortex is created in the fluid by a canister rotor 114 that includes an impeller 116. Canister rotor 114 sits at the bottom of canister 106. The rotating fluid process will continue so long as canister rotor 114 is turning.

Figure 4:
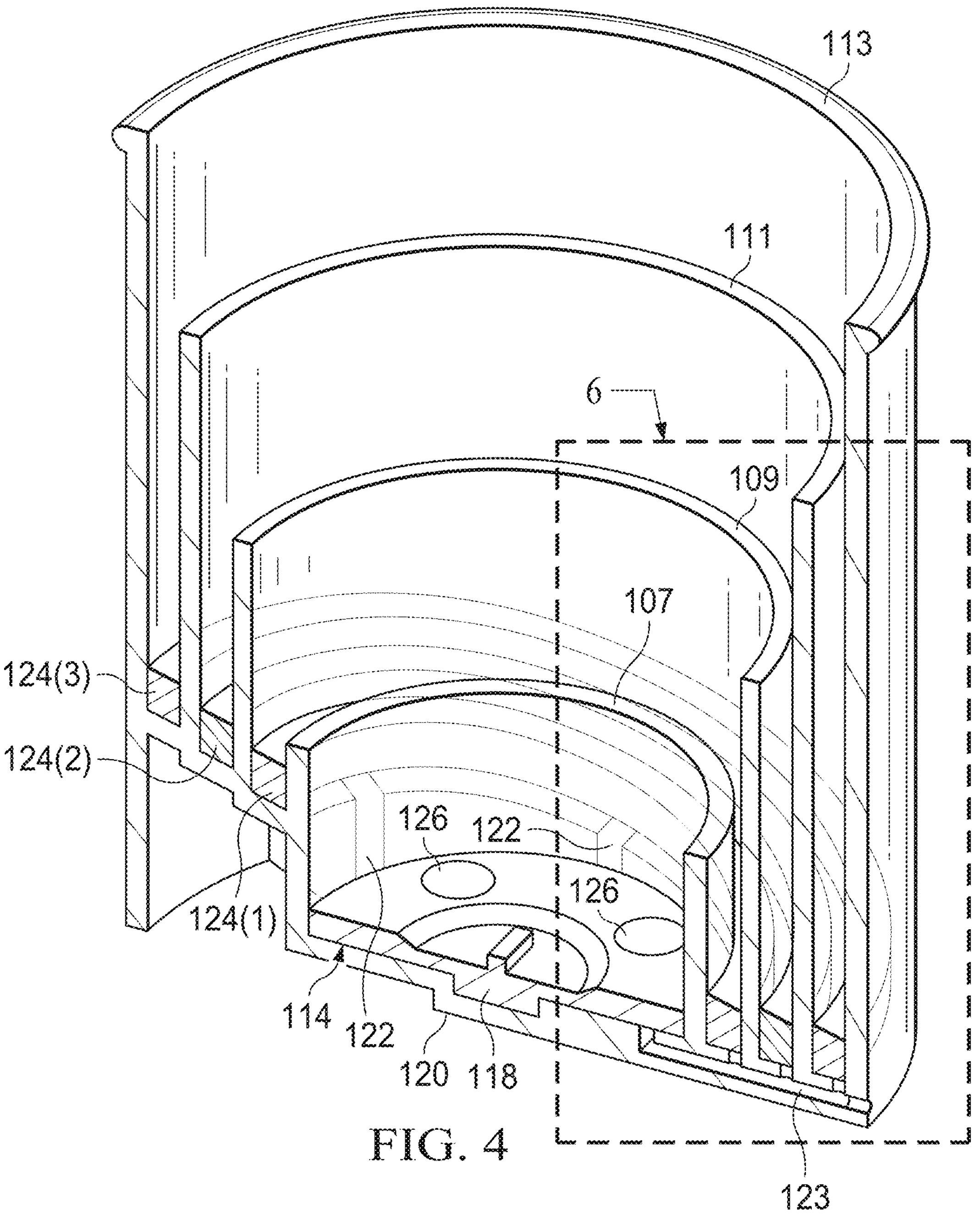
FIG. 4 is a sectioned view a processing canister assembly according to aspects of the disclosure.
Figure 5:
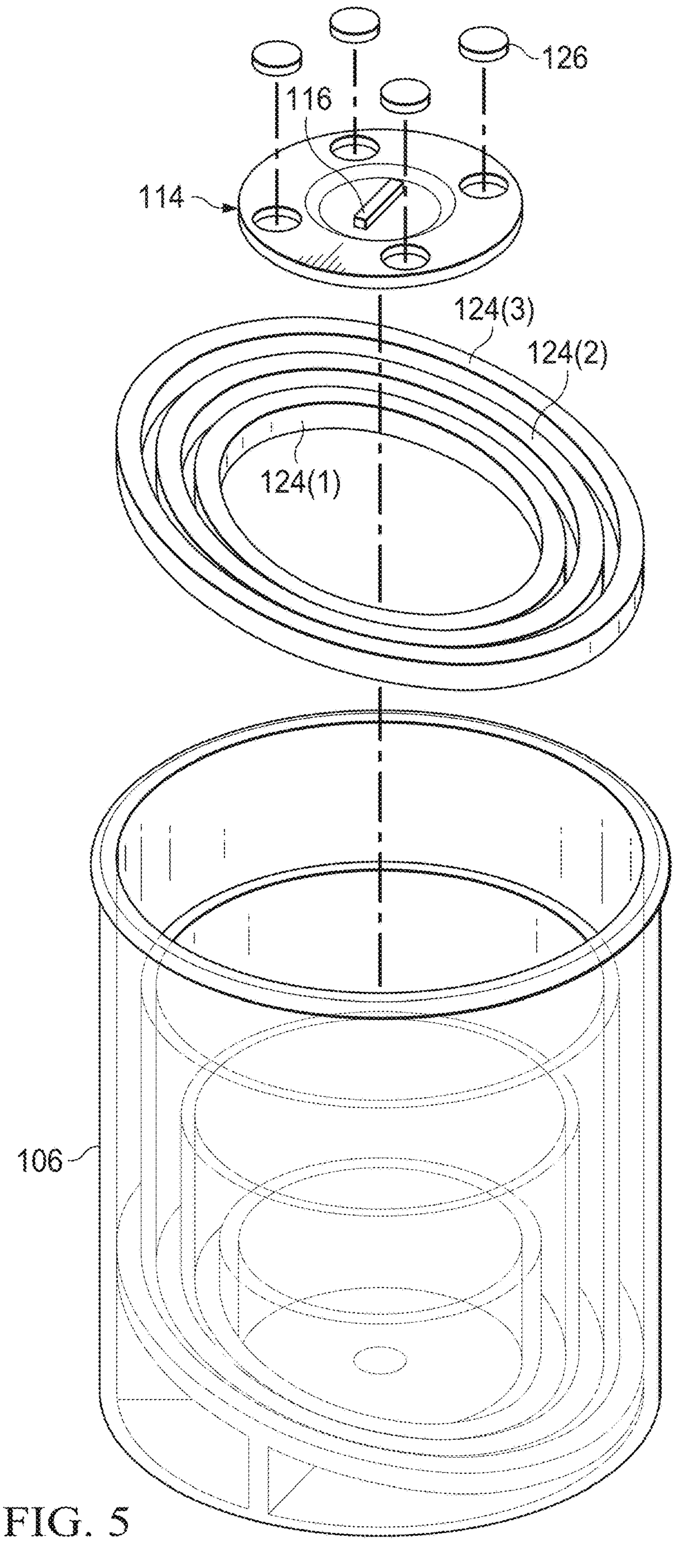
FIG. 5 is an exploded view of a processing canister assembly according to aspects of the disclosure.
Figure 6:
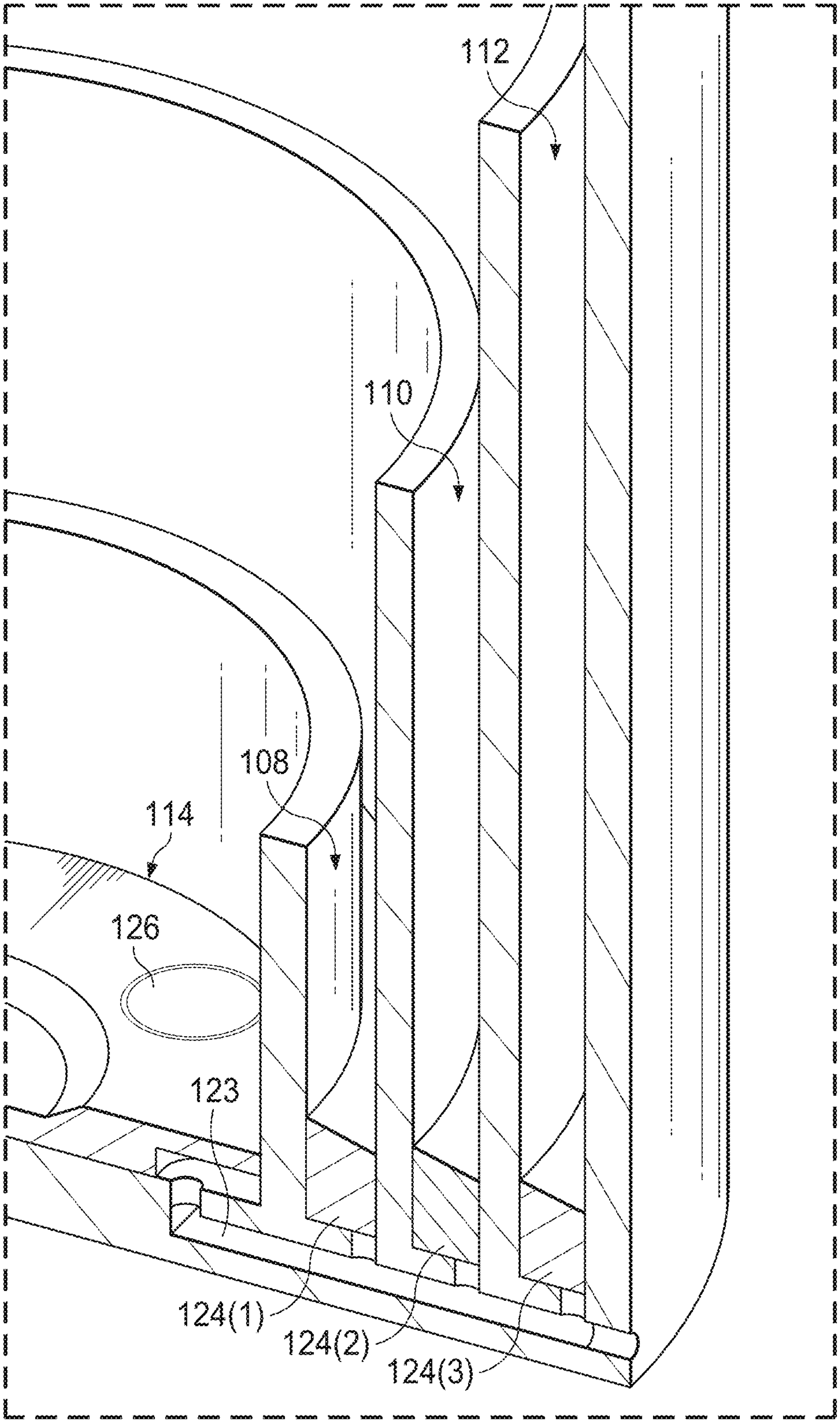
FIG. 6 is a detail view of the processing canister of FIG. 5.

FIG. 5 is an exploded assembly of canister 106. Impeller 116 is an integral part of canister rotor 114. Canister rotor 114 is a flat disc that includes a recess in which impeller 116 is located. Canister rotor 114 includes a protrusion 118 (see FIG. 4) that extends into a recess 120 of canister 106 to help properly locate canister rotor 114 within canister 106. As canister rotor 114 spins, impeller 116 stirs the fluid, resulting in a vortex within the fluid. The vortex moves the fluid in a rotational movement about a vertical centerline axis of canister 106. As the fluid rotates, its momentum carries the fluid over the edges of the walls 107, 109, 111, 113 and the fluid moves from the top of canister 106 down through the annuluses 108, 110, 112 through channels 122 to a chamber 123 in the bottom of canister 106 (see FIGS. 4 and 6). The fluid is then drawn out of chamber 123 by impeller 116 and back into canister 106 to complete another cycle. This motion is repeated, and over the course of the operation of the fluid separator, the various components of the fluid settle into their respective annulus based upon their weight (with the heaviest components settling in the outer annulus, the lightest components settling in the inner annulus, and the components between the lightest and heaviest settling in the middle annulus). Each annulus includes a filter 124(1)-124(3) (see FIGS. 5 and 6) that sits in the annulus. The separation of components may not result in a perfect sorting of the components into their annuluses and filters 124(1)-124(3) serve as a secondary form of separation so that the incorrect fluid components (e.g., lighter components that have settled into the heavier components annulus) pass through filters 124(1)-124(3) to be recirculated back into the main reservoir to recycle through the vortex again and eventually be collected in the correct annulus. In a relatively short time, the fluid will be separated so the separated components can be drawn off individually.

In some aspects, canister 106 could be shaped similarly to that of a laboratory beaker. In the aspects shown in the Figures, canister 106 includes an angled bottom. In other aspects, canister 106 may be configured with a flat bottom.

Figure 3:
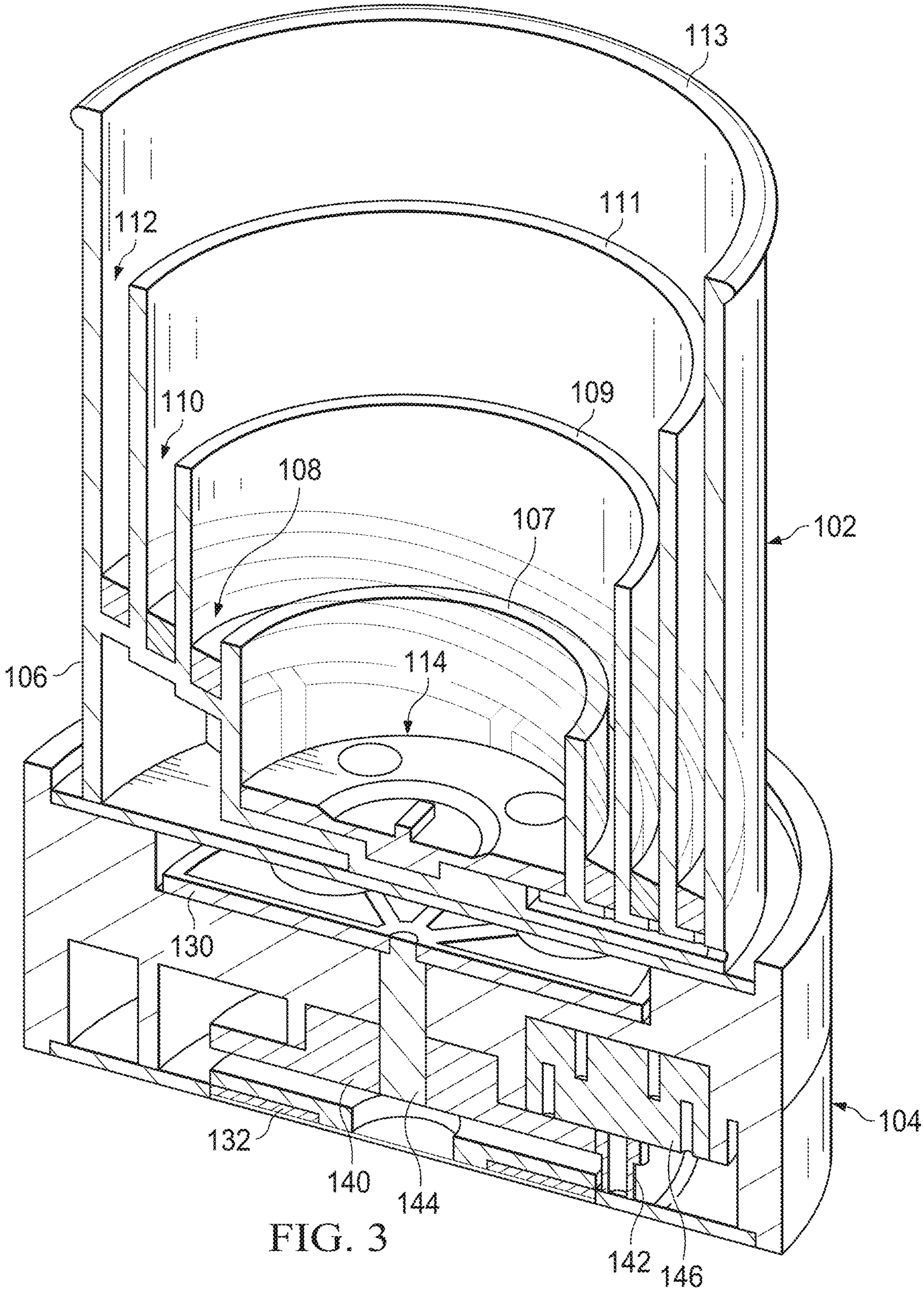
FIG. 3 is a sectioned view of FIG. 1.

In some aspects, canister rotor 114 includes a plurality of magnets 126 that interact with a plurality of magnets 128 of an induction base rotor 130 of induction base assembly 104 (see FIG. 3). As induction base rotor 130 spins, the magnetic fields of the plurality of magnets 128 interacts with the magnetic fields of the plurality of magnets 126 to rotate canister rotor 114 without a physical connection. This non-physical connection between induction base rotor 130 and canister rotor 114 permits processing canister assembly 102 to be easily placed upon and removed from induction base assembly 104. In some aspects, the poles of magnets 126 and 128 are oppositely oriented to attract one another (e.g., each magnet 126 and each magnet 128 is oriented with N facing upward so that when vertically aligned the magnets attract one another). In some aspects, the poles of magnets 126 and 128 are arranged in an alternating configuration (e.g., magnets 126 and 128 may be arranged in N-S-N-S configuration).

In some aspects, the bottom of canister 106 includes a thin outer layer/coating of a ferrous metal, such as a magnetic grade of stainless steel. Described in more detail later, an electromagnetic coil 132 within the induction base assembly 104 serves a secondary purpose to create an electromagnetic field that will interact with ferrous metals, causing the thin outer layer of metal to heat up. This is a similar process as seen on common induction stove cook tops. The heating of this thin ferrous metal layer is transmitted into and throughout canister 106, raising and maintaining the temperature of the fluid to about 98° F. (e.g., +/−3 degrees). Processing human blood and bone marrow at or around normal body temperatures is advantages. Canister 106 is self-contained and does not require batteries, power adapters, or plugs. In some aspects, induction base assembly 104 is a reusable part of the fluid separator 100.

Figure 7:
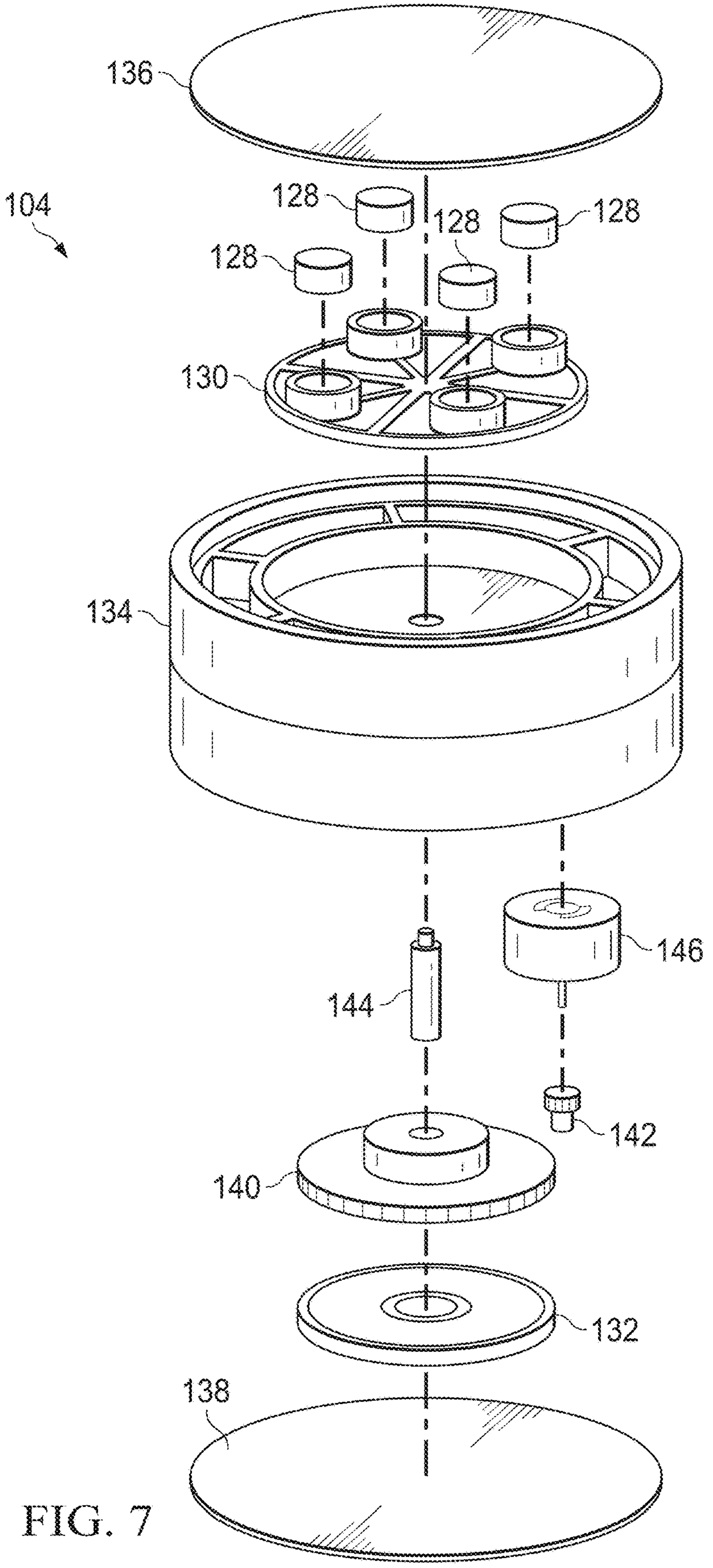
FIG. 7 is an exploded view of an induction base assembly according to aspects of the disclosure.

Referring now to FIG. 7, induction base assembly 104 is shown in an exploded view. Induction base assembly 104 includes: an induction base 134, induction base rotor 130, magnets 128, a rotor cover 136, a base cover 138, electromagnetic coil 132, reduction gear 140, drive gear 142, shaft 144, and a motor 146. Induction base rotor 130 is driven by motor 146, which may be, for example, a small DC electrical motor. Motor 146 is coupled to drive gear 142 and reduction gear 140 to control the speed and torque of induction base rotor 130. In some aspects, the energy required for motor 146 is generated within induction base 134 itself. Electromagnetic coil 132 is housed within the induction base 134 and interacts with an induction platform (i.e., the ferrous coating of canister 106). The induction platform is like an induction cook top commonly found in homes. The electromagnetic field produced by induction platform works with electromagnetic coil 132 to generate a specific voltage and amperage for the motor 146. No batteries, adapters, or plugs are required.

In summary, motor 146, powered by induction, spins induction base rotor 130. Canister rotor 114, which is magnetically coupled to induction base rotor 130, spins with induction base rotor 130 to produce a vortex within canister 106. Canister 106 is simultaneously heated by electromagnetic coil 132 via induction to about 98° F. Inside canister 106, the vortex mixes and separates the fluid into its components. The separated components of the fluid are dispersed and collected within the various annuluses to be drawn off.

Throughout this application, the term "about" is used to indicate that a value includes values that approximate the value described. For example, "about" includes values within 1%, 2%, 5%, and up to 10% of the value. The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a device or a method that "comprises," "has," "contains," or "includes" one or more elements possesses those one or more elements, but is not limited to possessing only those one or more elements or steps. Likewise, an element of a device or method that "comprises," "has," "contains," or "includes" one or more features possesses those one or more features, but is not limited to possessing only those one or more features.

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A fluid separator comprising:

a processing canister assembly; and an induction base assembly; wherein the processing canister assembly comprises a canister having a first barrier disposed within the canister that defines a first annulus; wherein the canister includes a canister rotor having a magnet and an impeller associated therewith; wherein the canister includes a filter disposed within the first annulus.

2. The fluid separator of claim 1, wherein the canister further comprises a second barrier disposed between the wall of the canister and the first barrier and defining a second annulus.

3. The fluid separator of claim 1, wherein the canister includes an angled bottom surface.

4. The fluid separator of claim 1, wherein the canister includes a chamber beneath and fluidly connected to the first annulus.

5. The fluid separator of claim 4, wherein the chamber is fluidly connected to an interior of the canister to recirculate fluid from the annulus to the interior of the canister.

6. The fluid separator of claim 1, wherein the induction base assembly comprises:

an induction base;

an induction base rotor having a magnet associated therewith; and a motor configured to drive the induction base rotor.

7. The fluid separator of claim 1, wherein the induction base assembly comprises an electromagnetic coil.

8. The fluid separator of claim 7, wherein the processing canister assembly includes a canister with a ferrous metal coating that is heated by the electromagnetic coil.

* * * * *